United States Patent [19]

Girard et al.

[11] 4,440,549

[45] Apr. 3, 1984

[54] METHOD FOR REDUCING PEAK VAPOR EMISSIONS IN SOLVENT RECOVERY SYSTEMS

[75] Inventors: Maurice V. Girard, Chateauneuf de Grasse, France; Michael J. Worrall, Hinsdale; Bernard R. Seguy, Lisle, both of Ill.

[73] Assignee: AMCEC Corporation, Oak Brook, Ill.

[21] Appl. No.: 367,950

[22] Filed: Apr. 13, 1982

[51] Int. Cl.³ .............................................. B01D 53/04
[52] U.S. Cl. ......................................... 55/59; 55/74
[58] Field of Search ............... 55/58, 59, 61, 62, 74, 55/179

[56] References Cited

U.S. PATENT DOCUMENTS

| 1,528,459 | 3/1925 | Voress et al. ............................ 55/62 |
| 1,595,683 | 8/1926 | Burrell et al. ............................ 55/59 |
| 1,753,067 | 4/1930 | Ray et al. ............................. 55/59 X |
| 2,747,681 | 5/1956 | Schuftan et al. .................... 55/62 X |
| 3,085,379 | 4/1963 | Kiyonaga et al. .................. 55/58 X |
| 3,274,755 | 9/1966 | Montagnon et al. ............... 55/59 X |
| 3,696,587 | 10/1972 | Young et al. ........................... 55/62 |
| 3,883,325 | 5/1975 | Fuhring et al. .................... 55/179 X |
| 4,021,211 | 5/1977 | Turek et al. ......................... 55/59 X |

FOREIGN PATENT DOCUMENTS

| 409994 | 5/1967 | Australia ................................. 55/61 |
| 520709 | 3/1931 | Fed. Rep. of Germany . |
| 2222400 | 11/1973 | Fed. Rep. of Germany . |
| 7315869 | 12/1973 | France . |

Primary Examiner—Robert H. Spitzer
Attorney, Agent, or Firm—Neuman, Williams, Anderson & Olson

[57] ABSTRACT

Methods for reducing the peak emission levels in solvent recovery systems that occur when an adsorber vessel is transferred from scrubbing to adsorption service by recirculating solvent laden air from the adsorber vessel through a condenser and returning it to the input of the recovery system following the termination of scrubbing and just prior to returning the vessel to adsorption service.

5 Claims, 1 Drawing Figure

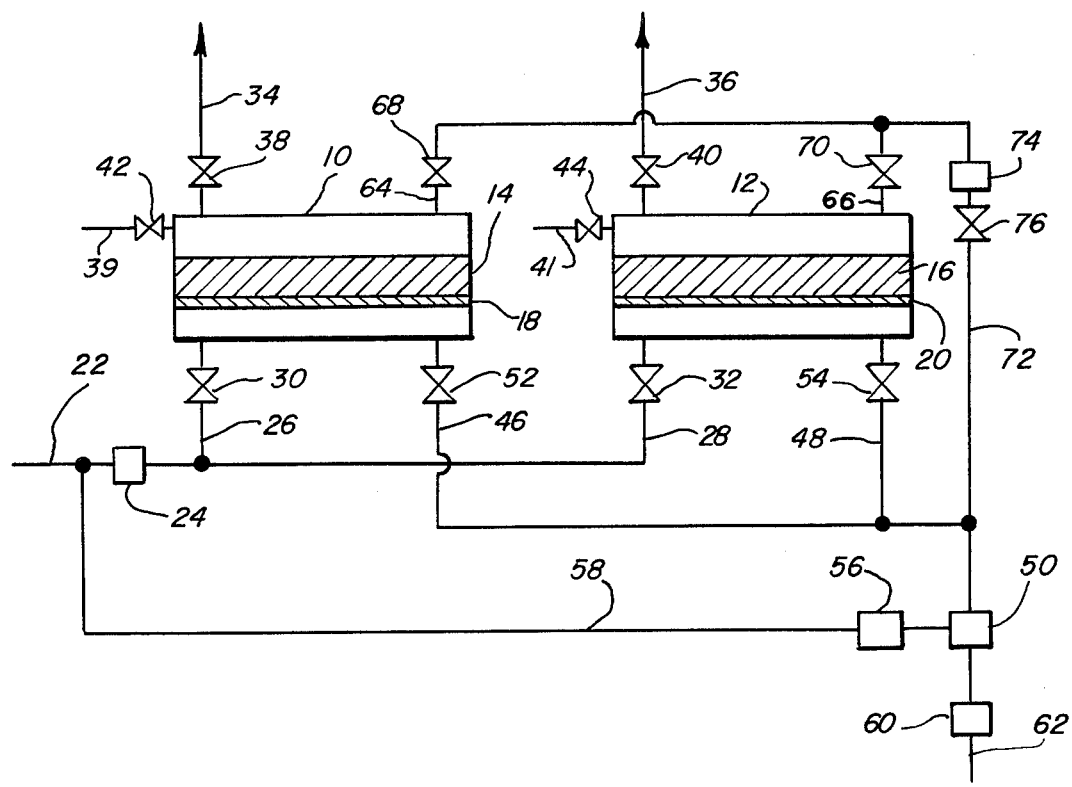

METHOD FOR REDUCING PEAK VAPOR EMISSIONS IN SOLVENT RECOVERY SYSTEMS

BACKGROUND OF THE INVENTION

The present invention relates to methods for use in cyclic continuous adsorption systems for recovering solvents from solvent laden air using activated carbon in two or more adsorber vessels as an adsorbent and live steam as the desorption media wherein one or more of the adsorber vessels are taken out of adsorption service in turn for regeneration.

Various methods and apparatus for recovering solvents from solvent laden air are well known in the prior art. In the past, it has been common to use activated carbon located in two or more adsorber vessels as the adsorption medium and live steam as the desorption medium. The solvent laden air is passed through the adsorber vessels and the solvent adsorbed by the adsorption medium; when the adsorption medium is fully charged, steam is passed through the vessel to heat the adsorption medium and desorb the solvent therefrom. This desorption operation is often referred to as "scrubbing". The solvent is then removed from the adsorber vessel by the steam and the steam/solvent vapor mixture may be condensed outside of the adsorber. Continuous operation of such recovery systems has been achieved by cyclically removing one or more, but less than all, of the adsorber vessels from adsorption service and scrubbing the adsorption medium in those vessels while the remaining vessels remain available for adsorption service.

It is known in the art that following the steam scrubbing operation, the adsorption medium must be both cooled down from the relatively high temperature to which it is heated by contact with the steam during the scrubbing operation and dried by removal of most of the water vapor remaining therein prior to its again returning to efficient adsorption operation. The cooling/drying step may be performed with the solvent laden air itself using the initial portion of the solvent laden air that passes through the adsorber vessel to perform the cooling/drying. Alternatively, the cooling/drying may be performed by using a fan to draw fresh air from the atmosphere through the adsorber vessel immediately following the scrubbing stage. In either case, the atmospheric air or the solvent laden air which passes through the adsorber vessel during the cooling/drying step is vented directly to the atmosphere resulting in an undesirable peak in the vapor emission from the recovery system since at least the steam, water vapor, and any solvent contained therein which are present in the adsorption vessel at the end of the steam scrubbing operation are vented directly to the atmosphere.

Because of increasing awareness of the problems associated with venting excessively large amounts of solvent material into the air, emission limitations have been imposed by various governmental bodies. Such limitations often place restrictions on both the average and peak emission levels of a particular facility. Moreover, because of the public awareness of the problems which can be associated with excessive emission levels, it is often desirable to reduce the level of highly visible, but relatively innocuous substances such as water vapor. Thus, it has become highly desirable to find methods of reducing emissions from systems of the type described which are both highly effective and economical both in construction and operation.

One such method is the subject of patent application No. 2 222 400 of the German Federal Republic and French Pat. No. 73 15869. In that method, an intermediate or purging step is interposed between the steam scrubbing operation and the cooling/drying step. The purging step is performed by drawing fresh air into the adsorber vessel and exhausting the vapors from the adsorber to a condenser until acceptably low levels of solvent and water vapor concentrations within the adsorber vessel is obtained. The exhausted air flow is introduced into the solvent laden air flow and thus passed through the adsorbing vessels which are then in adsorption service. The fresh air flow through the adsorption medium during the purging step is in the opposite direction of the flow of solvent laden air during the adsorption operation. The cooling/drying step is then performed using either fresh air or solvent laden air as discussed above.

The method discussed has been found to have a number of disadvantages associated therewith. For one, the adsorption vessels and associated fans and other components must be somewhat oversized since they must handle the fresh air used during the purging step as well as the solvent laden air. For another, the passage of air through the adsorption medium during the purging step is in the reverse direction of the flow of solvent laden air during adsorption, a condition which is believed to be undesirable.

The purpose of this invention is to provide methods which overcome the above noted deficiencies of present solvent recovery systems. More specifically, there are provided by this invention solvent recovery methods by which a purging step is provided between the steam scrubbing and cooling/drying step which purging step makes use of solvent laden air.

It is an object of this invention to provide solvent recovery methods which improve over the methods presently extant in the manners above noted.

It is an object of this invention to provide solvent recovery methods which are characterized by both effectiveness in operation and economy in construction and operation.

It is an object of this invention to provide solvent recovery methods which are effective to reduce the peak vapor emission levels from solvent recovery systems.

Further and additional objects of this invention will be apparent to those skilled in the art from the description, the drawing, and the appended claims.

DESCRIPTION OF THE DRAWING

The single drawing FIGURE shows in schematic form a solvent recovery system comprising two adsorber vessels and including a preferred embodiment of this invention.

DESCRIPTION OF THE PREFERRED EMBODIMENT

The solvent recovery system of the single drawing FIGURE includes first and second adsorber vessels 10 and 12. Adsorber vessels 10 and 12 each includes a bed of adsorbent material 14 and 16 located above a heat accumulator 18 and 20, respectively. The solvent laden air containing the solvent to be extracted enters the recovery system through a duct 22. A fan 24 supplies the solvent laden air through ducts 26 and 28 to the bottom of the adsorber vessels 10 and 12. Each of ducts 26 and 28 has a valve 30 and 32 disposed therein. An exhaust duct 34 and 36 leads from the top of each adsorber vessel to an exhaust device such as a stack for venting the air flowing therethrough to the atmosphere. Exhaust ducts 34 and 36 each have a valve 38 and 40 disposed therein. Steam is supplied to each adsorber vessel 10 and 12 at a point above the adsorbent bed through a steam supply pipe 39 and 41, each such supply pipe having a valve 42 and 44 located therein. Vapor pipes 46 and 48 lead from the bottom of the adsorber vessels 10 and 12 to a condenser 50, the vapor pipes having valves 52 and 54 disposed therein. The incondensible gas from condenser 50 is circulated through a separation chamber 56 and duct 58 and returned to supply duct 22 preferably on the low pressure side of fan 24. The condensate from condenser 50 is supplied to a cooler 60 for cooling the resultant condensation products, which products are supplied to a collection pipe 62. Water and the recovered solvent are taken from collection pipe 62.

As thus far described, the system of the drawing is a conventional solvent recovery system. Solvent laden air from duct 22 is forced by fan 24 through the adsorber vessel or vessels presently available for adsorption service. If, for example, vessel 10 is currently available for adsorption service and vessel 12 is undergoing scrubbing, valves 30 and 38 are open whereas valves 32 and 40 are closed. The solvent laden air thus passes from the duct 26 to the bottom of adsorber vessel 10 and up through heat accumulator 18 and adsorbent bed 14 and out exhaust duct 34 to the atmosphere, the solvent being removed from the solvent laden air by being adsorbed into the adsorption media which comprises the adsorption bed. No solvent laden air passes through adsorber vessel 12. At the same time, valves 44 and 54 are open and valves 42 and 52 closed so that steam passes from the supply pipe 41 to the top of adsorber vessel 12 and down through adsorbent bed 16 and heat accumulator 20 and out vapor pipe 48 to the condenser 50; no steam passes through adsorber vessel 10. The steam thus passes through the adsorption bed 12 in a direction which is opposite the direction of flow of the solvent laden air through the adsorption bed; the steam heats up the adsorption media in the adsorption bed 12, extracts the solvent therefrom, and carries the solvent to condenser 50. The solvent and the steam are condensed in condenser 50, cooled in cooler 60, and recovered at pipe 62. The gaseous exhaust of condenser 50, which contains mainly incondensible gases with some water and solvent vapors, goes through separation chamber 56 and is returned to the supply duct 22 preferably on the low pressure side of fan 24 for circulation through the adsorber vessel 10 to remove the remaining vapors. When the level of solvent concentration in the adsorption bed 16 of vessel 12 reaches a desirably low level, the steam scrubbing operation is terminated by closing valves 44 and 54 and vessel 12 can be returned to adsorption service. At a still later time when the level of solvent concentration in the adsorption bed 14 of vessel 10 becomes sufficiently high, that vessel can be removed from adsorption service by closing valves 30 and 38 and the steam scrubbing operation can be commenced by opening valves 42 and 52.

The methods and apparatus of this invention relate particularly to the manner of returning an adsorber vessel such as vessel 12 from the steam scrubbing operation to adsorption service. As discussed above, one method previously known is to simply open valves 32 and 40. In this case, the solvent laden air is used to cool and dry the adsorption media in adsorption bed 16 prior to the adsorption media being returned to its full adsorption efficiency. An undesirable peak in the level of emissions present in the exhaust through duct 36 then results from at least two causes. First, the steam which remained in the adsorber vessel 12 at the termination of the scrubbing operation and any solvent vapors contained therein is vented directly to the atmosphere. Second, before the adsorption material is sufficiently cooled and dried, its adsorption efficiency is very low so that an undesirably large amount of the solvent in the solvent laden air is not removed therefrom as the air passes through the adsorption bed. The unremoved solvent is passed directly to the exhaust duct 36 and the atmosphere.

In order to reduce the undesired peak in emission level when transferring an adsorber vessel from scrubbing to adsorption service, the adsorber vessels 10 and 12 of the apparatus of the drawing figure each include a duct 64 and 66 having a valve 68 and 70 located therein coupling the upper portion of the adsorber vessels through a duct 72 to the condenser 50. A three step process is then followed when an adsorber vessel is to be transferred from scrubbing to adsorption service, which process will be described with reference to adsorber vessel 12. At the end of scrubbing, valves 44 and 54 are closed to terminate the flow of steam to the vessel. Valves 32 and 70 are then opened for a short period of time with valve 40 remaining closed. While in this intermediate configuration, solvent laden air passes from duct 32 up through the adsorption bed 16, out duct 66 and through condenser 50 and expansion chamber 56 back to supply duct 22. This intermediate configuration has two particularly salutory results. First, the steam and solvent vapors which remain in the adsorber vessel at the termination of the scrubbing operation are purged from the adsorber and recirculated through condenser 50 and the solvent recovery system prior to being discharged into the atmosphere. Second, the initial flow of solvent laden air which is used to dry and cool the adsorption media to the point where its adsorption efficiency is sufficiently increased is also recirculated through the condenser 50 and the solvent recovery system. Thus, the undesirable emission peak which would otherwise occur on transferring an adsorber vessel from scrubbing to adsorption service are reduced and, in fact, may be substantially eliminated. When the emission level in the air passing through duct 66 reaches the desired low value, valve 40 is opened and valve 70 closed, thus completing the transfer of vessel 12 to adsorption service.

It is also to be particularly noted that the flow of the cooling/drying medium, in this case solvent laden air, across the adsorption bed 16 during the intermediate stage is in the same direction as the flow of solvent laden air when the adsorber vessel is in adsorption service. It is believed that passing the cooling/drying medium across the adsorption bed in this direction increases the adsorption efficiency of the adsorption media when the adsorber vessel is returned to adsorption service.

It may be found desirable in some applications of this invention to include a booster fan 74 in duct 72 with a valve 76 in duct 72 on the high pressure side of the fan as shown in the drawing. The booster fan 74 will operate only during the intermediate step between scrubbing and adsorption service and is effective to increase the flow of solvent laden air through the adsorber vessel during that step, thus reducing the time required to purge the adsorber and sufficiently cool and dry the adsorption vessel. Valve 76 is open only during the intermediate stage. It isolates and protects the fan 74 from the steam and solvent vapors in pipes 46 or 48 when either of adsorber vessels 10 or 12 is being scrubbed.

It will thus be apparent that a solvent recovery method has been provided which meets each of the aforementioned objects and effectively deals with the problems of the prior art discussed above. The described invention may be so successful in reducing both solvent and water vapor emission levels that the exhaust air may be recirculated into the building containing the apparatus generating the solvent laden air so that, in cold weather, the heat contained therein is not dissipated into the atmosphere.

It will be readily apparent to those skilled in the art that many variations on the above described embodiments may be made without departing from the spirit and scope of this invention. For example, while the invention has been described above with reference to a solvent recovery system using only two adsorber vessels, it may be used readily with such systems using three or more adsorber vessels. Further, it is also possible to use this invention in a solvent recovery system including several chambers located within a single shell, each chamber acting as a separate adsorber vessel. Gases other than air, such as nitrogen, may be used as the solvent carrier. Finally, although the invention has been described above with reference to adsorber vessels in which the solvent laden air passes up through the adsorption bed during adsorption and steam passes down through the adsorption bed during scrubbing, the respective directions of flow may also be reversed, it only being desired that the direction of steam flow during scrubbing be opposite to the direction of solvent laden air flow during adsorption. The invention may also be practiced in solvent recovery systems that include no heat accumulator in the adsorber vessels. It is intended that the true breadth of this invention be defined in the following claims.

We claim:

1. The method of reducing peaks in water vapor and solvent emission levels during cooling and drying of an adsorber container following the termination of steam scrubbing of the adsorber container in a system for recovering solvents from solvent laden gas comprising the steps of:
    terminating the flow of steam through said adsorber container to end said steam scrubbing operation;
    initiating a flow of solvent laden gas through said adsorber container to begin said cooling and drying operation;
    recirculating the flow of solvent laden gas from said adsorber container back to an input of said solvent recovery system;
    maintaining said recirculating flow until the emission level in the gas leaving said adsorber container reaches a predetermined level;
    terminating said recirculating flow and discharging the flow of gas from said adsorber container to the atmosphere.

2. The method of claim 1 wherein during said recirculating step the recirculated solvent laden gas is further passed through a condenser.

3. The method of claim 2 wherein the direction of flow of solvent laden gas through said adsorber container during said recirculating step is opposite the direction of flow of steam through said adsorber container during steam scrubbing.

4. The method of claim 1 wherein the solvent laden gas is solvent laden air.

5. The method of reducing peaks in water vapor and solvent emission levels during cooling and drying of an adsorber container following the termination of steam scrubbing of the adsorber container in a system for recovering solvents from solvent laden air comprising the steps of:
    terminating the flow of steam through said adsorber container to end said steam scrubbing operation;
    initiating a flow of solvent laden air through said adsorber container in a direction opposite to the direction of steam flow through said adsorber container during steam scrubbing;
    recirculating the flow of solvent laden air from said adsorber container through a condenser and back to an input of said solvent recovery system;
    maintaining said recirculating flow until the emission level in the air leaving said adsorber container reaches a predetermined level;
    terminating said recirculating flow and discharging the flow of air from said adsorber container to the atmosphere.

* * * * *